(12) United States Patent
Haka

(10) Patent No.: US 7,707,905 B2
(45) Date of Patent: May 4, 2010

(54) SHIFT MECHANISM FOR A MANUAL PLANETARY TRANSMISSION

(75) Inventor: Raymond J. Haka, Brighton, MI (US)

(73) Assignee: GM Global Technology Operations Inc., Detroit, MI (US)

( * ) Notice: Subject to any disclaimer, the term of this patent is extended or adjusted under 35 U.S.C. 154(b) by 596 days.

(21) Appl. No.: 11/620,066

(22) Filed: Jan. 5, 2007

(65) Prior Publication Data

US 2007/0107543 A1 May 17, 2007

Related U.S. Application Data

(63) Continuation-in-part of application No. 10/666,148, filed on Sep. 18, 2003, now abandoned.

(51) Int. Cl.
*B60K 20/00* (2006.01)
*G05G 5/08* (2006.01)

(52) U.S. Cl. ............ 74/473.25; 475/269; 74/337.5

(58) Field of Classification Search ............ 74/335, 74/337.5, 473.24, 473.25, 473.26, 473.36; 475/269–271, 275, 284, 303, 331
See application file for complete search history.

(56) References Cited

U.S. PATENT DOCUMENTS

| 5,740,695 A * | 4/1998 | Janson ............ 74/337.5 |
| 6,835,157 B2 * | 12/2004 | Haka ............ 475/269 |
| 2004/0142787 A1 * | 7/2004 | Milbourne et al. ...... 475/269 |

* cited by examiner

*Primary Examiner*—Thomas R Hannon
*Assistant Examiner*—James Pilkington

(57) ABSTRACT

A shift mechanism for a manual planetary transmission has a plurality of control members. Each control member has a slot configuration for each shift rail defined therein. The slot configurations are aligned among plates and a pin member is inserted in each of the slot configurations. Manipulation of any one of the plates produces movement of two or more of the pin members. The pin members are operable upon movement to select the engagement of the synchronizers, which are disposed within a power transmission. The synchronizers establish drive ratios between the input shaft for the transmission and the output shaft for the transmission.

11 Claims, 7 Drawing Sheets

SHIFT MECHANISM FOR A MANUAL PLANETARY TRANSMISSION

CROSS-REFERENCE TO RELATED APPLICATIONS

The present application is a continuation-in-part of, and claims priority to, U.S. patent application Ser. No. 10/666,148, filed on Sep. 18, 2003, now abandoned, entitled "Shift Mechanism for a Manual Planetary Transmission", which is incorporated by reference in its entirety.

TECHNICAL FIELD

This invention relates to transmission controls and, more particularly, to shift mechanisms for a manual planetary transmission.

BACKGROUND OF THE INVENTION

Manual transmissions are being reconsidered because they provide a more efficient powertrain due to the reduction in the amount of fluid power that is required to control the automatic shifting planetary transmission. Planetary manual transmissions are being considered because of the lower cost and mass of planetary gears relative to countershaft gears. When using planetary transmissions, it is necessary to engage two or more torque-transmitting mechanisms substantially simultaneously in order to produce a usable drive ratio within a planetary gear arrangement. In these more conventional automatic transmissions, the torque-transmitting mechanisms are fluid-operated devices controlled by a plurality of valves and electronic controls. This permits the selective actuation and deactuation of the torque-transmitting mechanisms.

Manual planetary transmissions, however, employ synchronizer type torque-transmitting mechanisms, which are mechanical in nature and are generally controlled by a shift rod, which is under the manipulative control of the operator. In manual planetary transmissions, it is necessary to engage and/or disengage two synchronizers to establish a drive ratio through a planetary gear arrangement. One such mechanical shift control mechanism is shown in U.S. Pat. No. 6,835,157, issued Dec. 28, 2004, in the name of Haka and assigned to the assignee of this application.

SUMMARY OF THE INVENTION

It is an object of the present invention to provide an improved shift mechanism for a manual planetary transmission.

In one aspect of the present invention, the shift mechanism employs a plurality of plate members having slotted openings formed therein to control one or more shift rails.

In another aspect of the present invention, one of the plate members is a neutral plate, which maintains the shift rods in a neutral position prior to shifting from one ratio to another.

In yet another aspect of the present invention, each of the plate members has a surface configuration, which will move all of the plates between the shifted plate and the neutral plate upward to release the control rods from the neutral plate.

In still another aspect of the present invention, the surface configurations are elongated indentations formed in each plate member.

In yet still another aspect of the present invention, the plates are nested on the surface configurations.

In a further aspect of the present invention, each of the plates has a control slot for each of the shift rods necessary to control the synchronizers of a manual planetary transmission.

In a still further aspect of the present invention, each of the control slots has a neutral slot and a slot perpendicular to the neutral slot.

In yet a further aspect of the present invention, each of the perpendicular slots will provide for continued neutral control or for a shift control for one of the shift control rods.

DETAILED DESCRIPTION OF THE EXEMPLARY EMBODIMENTS

Figure 1:
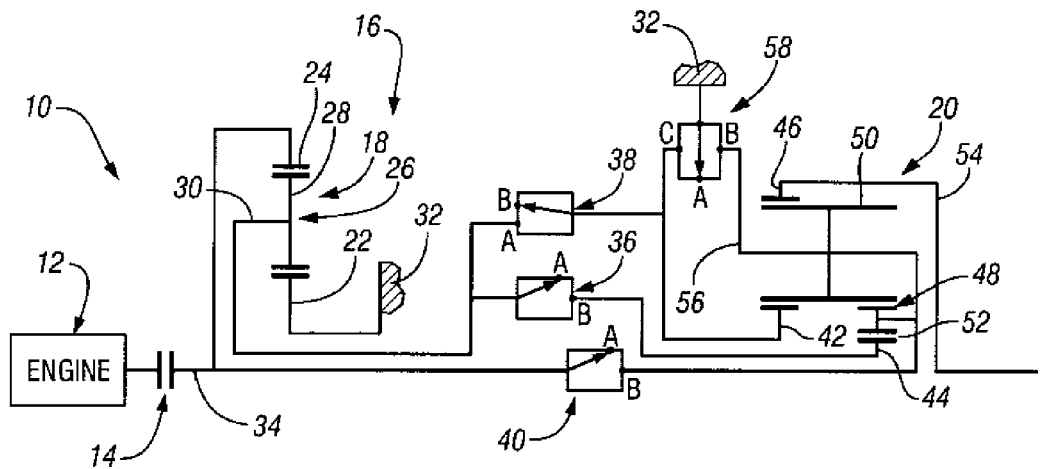
FIG. 1 is a schematic representation of a powertrain describing a manual planetary transmission capable of providing six forward speed ratios and one reverse speed ratio.

Referring to the drawings, wherein like characters represent the same or corresponding parts throughout the several views, there is shown in FIG. 1 a powertrain 10 including a conventional engine 12, a conventional selectively operable input clutch or torque-transmitting mechanism 14, and a planetary gear arrangement 16. The planetary gear arrangement 16 includes two planetary gearsets 18 and 20, which are combined to form a planetary arrangement.

The planetary gearset 18 includes a sun gear member 22, a ring gear member 24, and a planet carrier assembly member 26, which has a plurality of pinion gears 28 rotatably mounted on a planet carrier member 30 and disposed in meshing relationship with both the sun gear member 22 and the ring gear member 24.

The sun gear member 22 is continuously connected to a portion of a transmission housing 32 and is therefore held stationary continuously. The ring gear member 24 is connected with an input shaft 34, which is also connected with the input clutch or torque-transmitting mechanism 14. The planet carrier member 30 is drivingly connected with a mechanical torque-transmitting mechanism or synchronizer 36 and also with a mechanical torque-transmitting mechanism or synchronizer 38. The input shaft 34 is drivingly connected with a mechanical torque-transmitting mechanism or synchronizer 40.

Each of the mechanical torque-transmitting mechanisms 36, 38, and 40 are conventional synchronizer type shift mechanisms, which are well known in the art. The torque-transmitting mechanisms 36 and 40 are rotating type torque-transmitting mechanisms, which are generally referred to as clutches. The torque-transmitting mechanism 38 is a dual purpose synchronizer and provides a rotating type torque-transmitting mechanism when connected with the planet carrier member 30 and a stationary type torque-transmitting mechanism or brake when connected with the transmission housing 32.

The planetary gearset 20 is a gearset commonly referred as a Ravigneaux type gearset. This gearset 20 includes two sun gear members 42 and 44, a ring gear member 46, and a planet carrier assembly member 48. The planet carrier assembly member 48 includes a plurality of long pinion gears 50 and a plurality of short pinion gears 52. The long pinion gears 50 mesh continuously with the sun gear member 42 and the ring gear member 46. The short pinion gears 52 mesh continuously between the sun gear member 44 and the long pinion gears 50. Those skilled in the art will recognize that the planetary connection between the sun gear member 42 and the ring gear member 46 is a simple planetary gear connection while the connection between the sun gear member 44 and the ring gear member 46 is a compound connection.

The ring gear member 46 is continuously drivingly connected with a transmission output shaft 54, which in turn is connected to drive the vehicle wheels in a well known manner. The pinion gears 50 and 52 are rotatably mounted on a planet carrier member 56, which is drivingly connected with a portion of the mechanical torque-transmitting mechanism 40 and also drivingly connected with a portion of a mechanical torque-transmitting mechanism or synchronizer 58. The mechanical torque-transmitting mechanism 58 is a synchronizer type torque transmitter, which is effective to selectively connect the planet carrier member 56 to the transmission housing 32 and therefore operates as a brake.

As is well known, synchronizers have a neutral condition and at least one active condition. The torque-transmitting mechanisms 36, 40, and 58 all have a neutral condition and an active condition. In the active condition of torque-transmitting mechanism 36, the planet carrier member 30 is drivingly connected with the sun gear member 44. In the active condition of the torque-transmitting mechanism 40, the input shaft 34 is drivingly connected with the planet carrier member 56. In the active condition of the torque-transmitting mechanism 58, the planet carrier member 56 is connected with the stationary housing 32 or the sun 42 can be connected with the stationary housing 32. Obviously, the torque-transmitting mechanisms 40 and 58 would not be engaged at the same time.

The torque-transmitting mechanism 58 is a three-position synchronizer having two active positions and a neutral position. In one active position, the synchronizer 38 provides a drive connection between the planet carrier member 30 and the sun gear member 42. In another active position, the synchronizer or torque-transmitting mechanism 58 provides a braking connection between the sun gear member 42 and the transmission housing 32.

The synchronizer 36 has two positions A and B, A being the neutral position and B being the drive position. The synchronizer 58 has three positions A, B, and C, A, being the neutral position, C, being the sun 42 brake position, and B being the carrier 56 brake position. The synchronizer 40 has two positions A and B, A being the neutral position and B being a drive position connecting the input shaft 34 to the planet carrier member 56. The synchronizer 38 has two positions A and B, B being the neutral position and A being the condition in which the planet carrier member 30 is connected with sun 42. The synchronizers 36, 40, and 58 are always shifted from neutral in one direction of operation while the synchronizer 58 is shifted from neutral to an operating condition either side of neutral.

Figure 2:
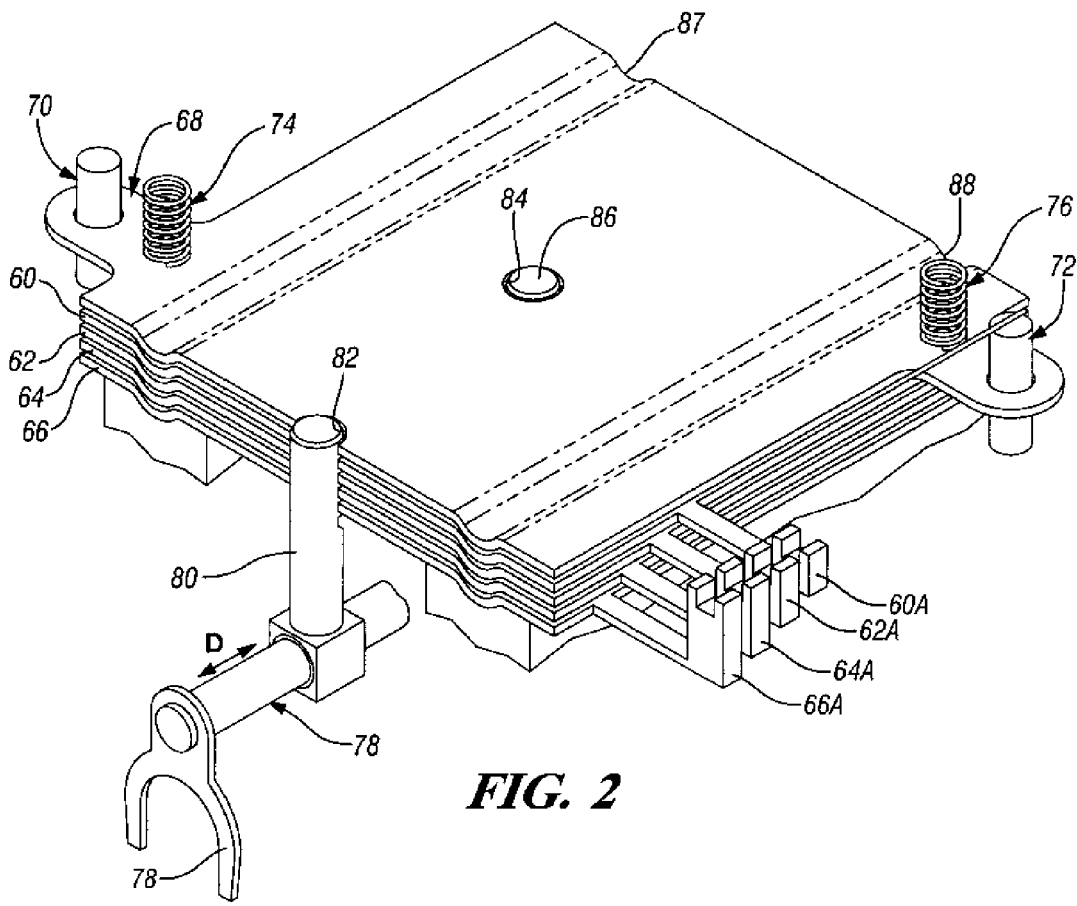
FIG. 2 is a diagrammatic representation of a portion of the shift control mechanism showing the plates in a neutral position.

Shown diagrammatically in FIG. 2 is a portion of a shift control mechanism incorporating four control shift plates 60, 62, 64, and 66, and a neutral plate 68. The neutral plate 68 is held stationary in the lateral directions and is permitted to move vertically along a pair of pins or pegs 70 and 72. The plate 68 is urged downwardly by springs 74 and 76. The plate 60 is the reverse plate, plate 62 is the 1-2 shift control plate, the plate 64 is the 3-4 shift control plate, and the plate 66 is the 5-6 shift control plate.

Also shown in FIG. 2 is a conventional shift rail or shift control rod 78, which is typical of the four shift control rods necessary to operate the four synchronizers 36, 38, 40, and 58 by means of a shift fork 79. The shift control rail 78 is movable in the direction of Arrow D and includes a vertical or upright pin portion 80, which is engaged with each of the plates 60, 62, 64, 66, and 68. The engagement with the plate 68 is by way of a circular opening 82. Another circular opening 84 can also be seen, which is the opening for the engagement of a pin member 86 of another control rod, not shown. Shift rails or shift control rods are well known to those skilled in the art since they have been used in manually controlled transmissions for many years. Also, those skilled in the art will be fully aware that these shift control mechanisms are generally combined with shift forks that manipulate the synchronizer mechanism during a ratio change in the transmission. One such mechanism is shown in U.S. Pat. No. 1,944, 331, issued to E. A. Thompson on Jul. 30, 1932. This and similar devices have been in use since then.

Figure 3:
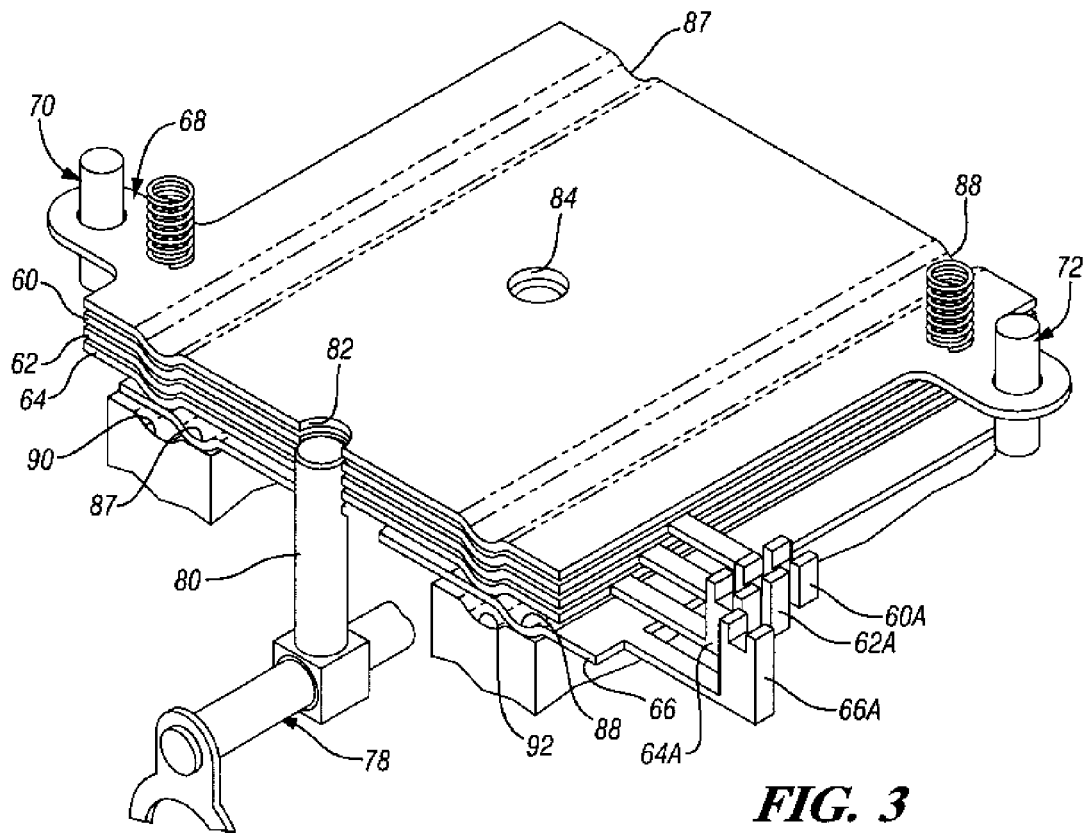
FIG. 3 is a view similar to FIG. 2 wherein one of the control plates has been moved from the neutral position to an operable position.

As seen in FIG. 3, the shift control plate 66, which is the 5-6 control plate, has been moved from the neutral position shown in FIG. 2 to the fifth ratio position. Each of the plates 60, 62, 64, 66, and 68 has a pair of longitudinally extending indentations, grooves or surface characteristics 87 and 88. As seen in FIG. 2, these indentations or grooves 87 and 88 are aligned or nested such that the plates are stacked substantially in contact when the plates are in a neutral position. The pairs of longitudinal indentations or grooves 87 and 88 provide a means for preventing movement of more than one of the plates 60, 62, 64, and 66 at a time. Each of the plates 60, 62, 64, and 66 have respective slotted portions 60A, 62A, 64A, and 66A.

A conventional manual shift linkage provides a means for manipulating having a pin (element 228 illustrated in FIGS. 10 and 11) that is movable among the slotted portions 60A, 62A, 64A, and 66A to establish which of the plates 60, 62, 64 and 66 will be manipulated by the shift control linkage pin. The pin is manipulable east-west (fore and aft) to engage the slots 60A, 62A, 64A, and 66A and north-south (transversely) to make a gear selection by moving the respective plates 60, 62, 64 and 66.

The plates 60, 62, 64, and 68, as seen in FIG. 3, are moved vertically a distance of twice the height of the indentations 87 and 88. When the plate 66 moves laterally, the indentations 87 and 88 move out of respective stationary control indentations 90 and 92 and therefore lift all of the plates one height of the indentation. Also, during this lateral movement, the indentations 87 and 88 of the plate 64 abut a flat surface on the plate 66 which is therefore also move vertically the height of the indentations 87 and 88. Thus, the stack of plates above the plate 66 are moved vertically a distance equal to the height of twice of the indentations.

This vertical movement releases the control pins for the control rods from the openings in the neutral plate 68 and thereby will permit the control rods to move relative to the neutral plate and thereby control the shifting of the synchronizers 36, 38, 40, and 58, respectively. The control rail 78 is effective to control the operation of the synchronizer 36 and is therefore moved with the 1-2 shift plate 60 and the 34 shift plate 64.

Figure 4:
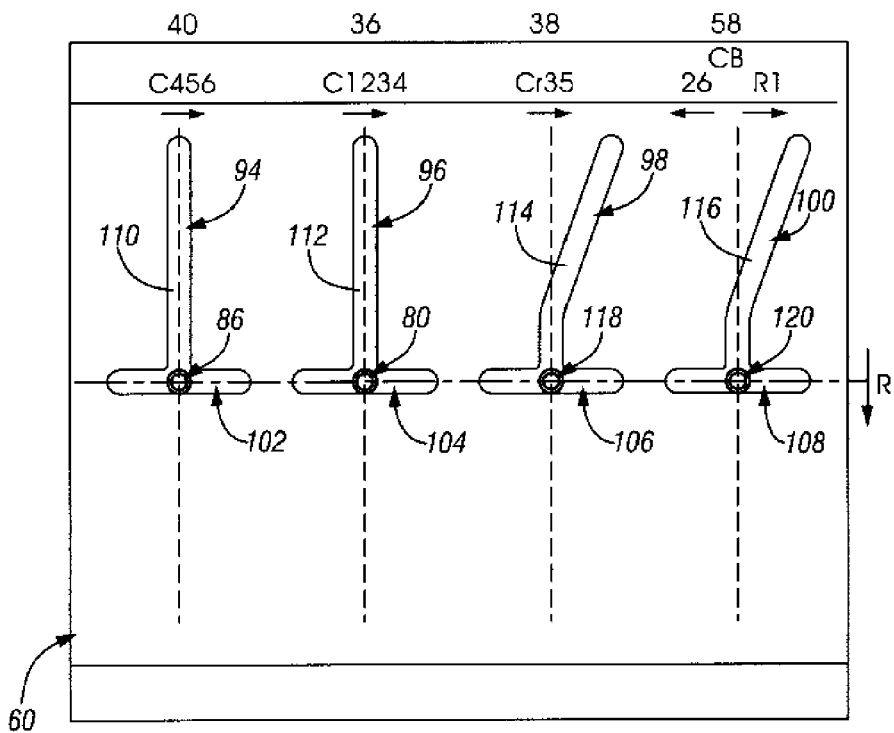
FIG. 4 is a diagrammatic representation of the slot configuration in the reverse shift control plate for the reverse shift control mechanism.

FIG. 4 is a representation of the reverse plate 60. The reverse plate 60, as does each of the control plates, has four control slots 94, 96, 98, and 100. The control slot 94 has a neutral slot portion 102, the control slot 96 has a neutral slot portion 104, the control slot 98 has a neutral slot portion 106, and the slot 100 has a neutral slot portion 108. Each of the control slots 94, 96, 98, and 100 also have respective shift control slots 110, 112, 114, and 116.

As seen in FIG. 4, the control pin 80 is located in the slot 96, which is the control slot for the synchronizer 36. The control slot 94 houses the control slot 86, the control slot 98 houses a control pin 118, and the control slot 100 houses a control pin 120. The control pin 86 is effective to control the synchronizer 40. The control pin 118 is effective to control the synchronizer 38. The control pin 120 is effective to control the synchronizer 58. If the plate 60 is moved in the direction of Arrow R, the pins 86 and 80 will remain in the slot 94 and 96. However, the pins 118 and 120 will be moved to the right in the slots 98 and 100. This will cause manipulation of the synchronizers 38 and 58. The synchronizer 58 will ground the carrier 56 at position 58B (FIG. 1) and the synchronizer 38 will connect the carrier 30 with the sun gear member 42. This will establish a reverse drive between the sun gear member 42 and the ring gear member 46 and therefore with the output shaft 54.

Figure 5:
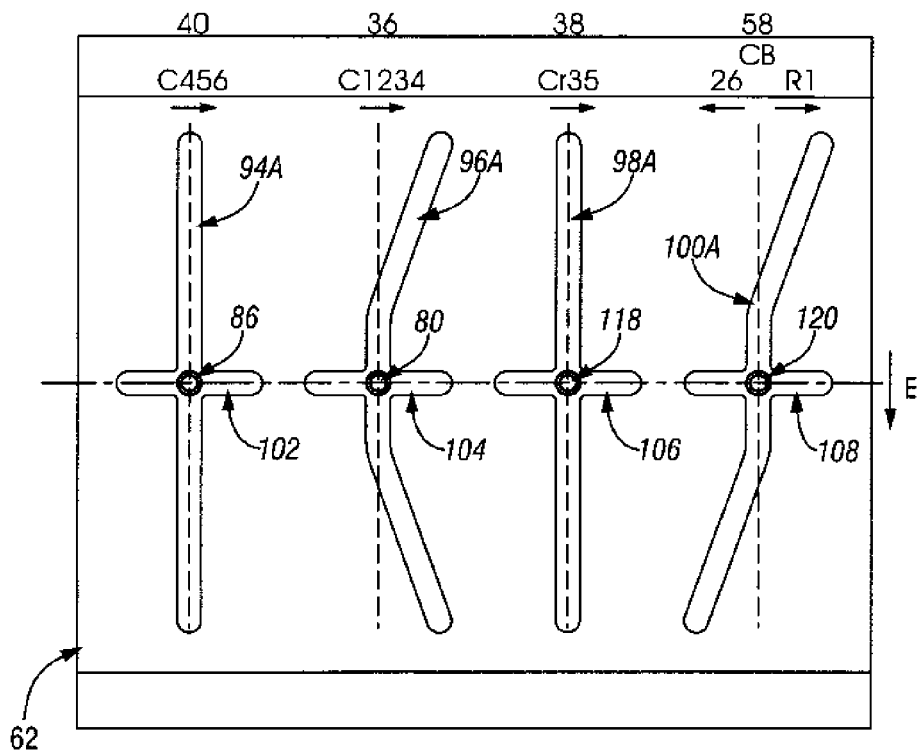
FIG. 5 is a diagrammatic representation of the slot configuration for the 1-2 shift control plate of the shift control mechanism.

In FIG. 5, the slots 94A, 96A, 98A, and 100A of the shift control plate 62 are shown. The slot 94A aligns in the neutral position with the slot 94, the slot 96A aligns in the neutral position with the slot 96, the slot 98A aligns in the neutral position with the slot 98, and the slot 100A aligns in the neutral position with the slot 100. The plate 62 is manipulated whenever a neutral-to-first or a neutral-to-second shift is desired. For a shift to first gear, the plate 62 is shifted downward, as seen in FIG. 5 in the direction of Arrow E, and for the second ratio, the plate 62 is shifted upward, as seen in FIG. 5, opposite the direction of Arrow E.

The shifting of the plate 62 will enforce the plates 60 and 68 to move upward thereby releasing the pins 80, 86, 118, and 120. The manipulation of the plate 62 downward in the direction of Arrow E will cause the pin 80 to move rightward in the slot 96A and also cause the pin 120 to move rightward in the slot 100A. This will cause manipulation of the synchronizers 36 and 58 while retaining the synchronizers 38 and 40 in the neutral position as controlled by the slots 94A and 98A as well as the neutral slot 102 and 106.

Manipulation of the plate 62 to the second ratio position; that is, upward opposite Arrow E, the pin 80 will be moved rightward in the slot 96A and the pin 120 will be moved leftward in the slot 100A. With the manipulation of the pin 80, the synchronizer 36 will again be engaged to provide a drive connection at position 36B and the synchronizer 58 will be manipulated to provide a braking connection between the housing 32 and position 58C. The pins 118 and 86 will again be retained in the neutral position by the slots 94A and 98A and the neutral slots 102 and 106.

Figure 6:
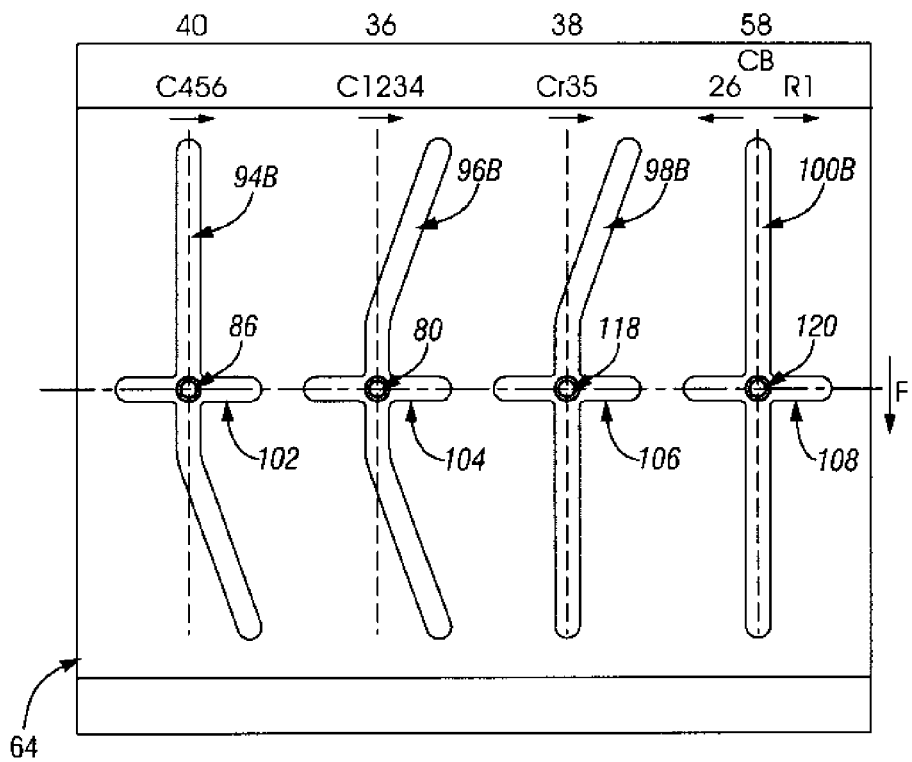
FIG. 6 is a diagrammatic representation of the slot configuration for the 3-4 shift control plate of the shift control mechanism.

The slot configuration of the 3-4 shift control plate 64 is shown in FIG. 6. The 3-4 shift control plate 64 has formed therein slots 94B, 96B, 98B, and 100B, which are aligned in a neutral position with the slots 94, 94A, 96, 96A, 98, 98A, and 100, 100A. The 3-4 shift control plate 64 is manipulated by the control mechanism when the operator desires to establish either the third forward speed ratio or the fourth forward speed ratio. To establish the third forward speed ratio, the plate 64 is moved downward in the direction of Arrow F such that the pin 80 will move rightward in the slot 96B, the pin 118 will move rightward in the slot 98B, and the pins 120 and 86 will remain in the neutral position. As the pins 80 and 118 move rightward, they are also retained along the neutral plane in the respective neutral slots 104 and 106 of the plates 60, 62, and 66.

When the plate 64 is manipulated upward opposite the direction of Arrow F, the fourth forward speed ratio will be established. During upward manipulation of the plate 64 relative to the other plates in the stack, the pin 86 will be moved rightward along the slot 94B, the pin 80 will be moved rightward along the slot 96B, and the pins 118 and 120 will remain in the neutral position as controlled by the slots 98B, 100B, 106 and 108. During this manipulation, the synchronizer 40 will be manipulated to engage the input shaft 34 with the planet carrier member 56 and will manipulate the synchronizer 36 to engage the planet carrier member 30 with the sun gear member 44. This will provide two forward input rotations to the Ravigneaux planetary gearset 20, which will result in a forward rotation of the output shaft 54.

Figure 7:
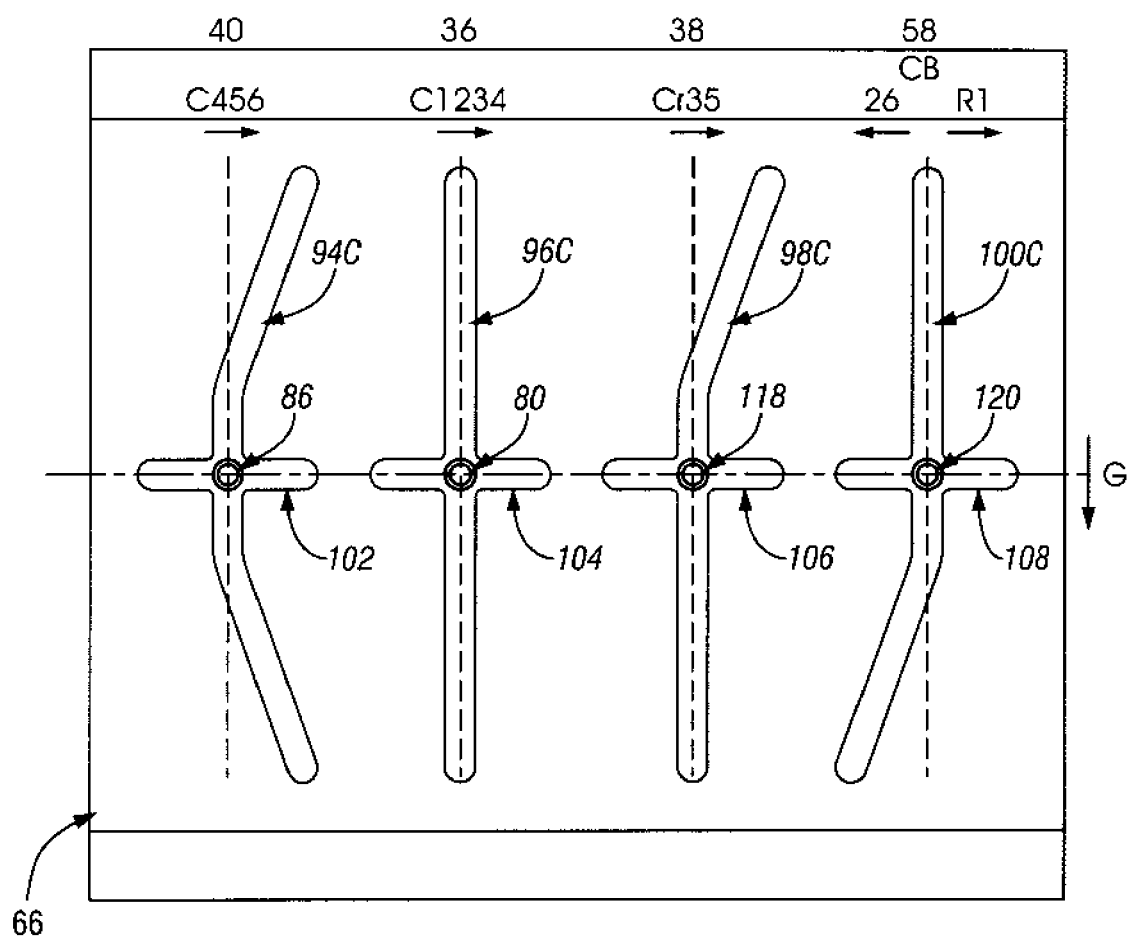
FIG. 7 is a diagrammatic representation of the slot configuration for the 5-6 shift control plate of the shift control mechanism.

The slot configuration of the 5-6 shift control plate 66 is shown in FIG. 7. The plate 66 is moved downward in the direction of Arrow G to the fifth position and upward opposite the direction of Arrow G from the neutral position to the sixth position.

Figure 8:
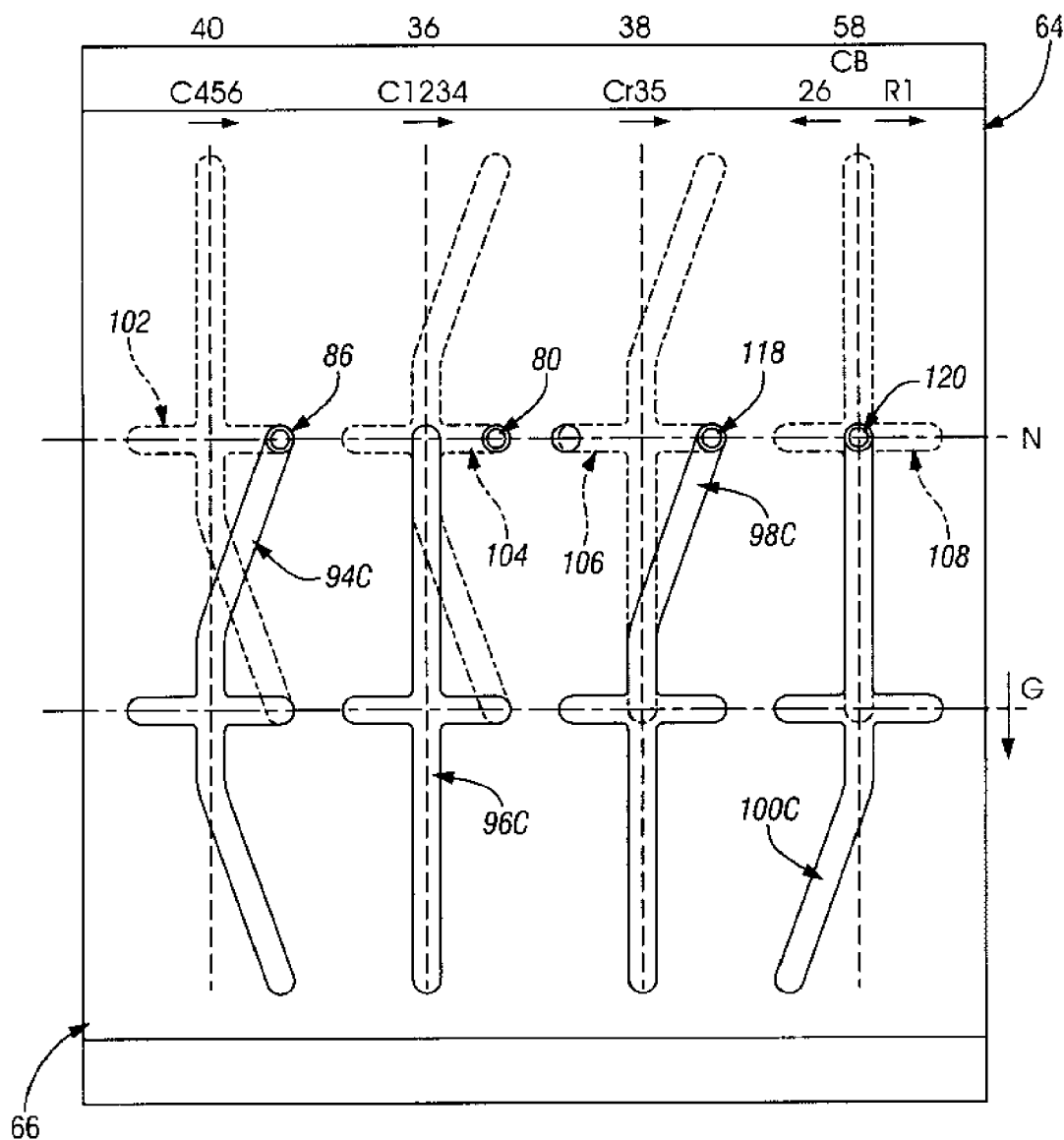
FIG. 8 is a diagrammatic representation of the slot configuration showing the 5-6 shift control plate moved relative to the stacked control plates to the shift ratio position.

When the plate 66 is moved downward to the fifth position, as shown in FIG. 8, the pin 86 is moved rightward by the slot 94C while remaining in the neutral slot 102. The pin 118 is moved rightward in the slot 98C while remaining in the neutral slot 106. This results in engagement of the synchronizer 40 between the input shaft 34 and the planet carrier member 56, which was also done in the fourth ratio, and the manipulation of the synchronizer 38 to connect the planet carrier member 30 with the sun gear member 42.

As in fourth gear, this will provide two forward input drives to the Ravigneaux planetary gearset 20 resulting in a forward rotation of the output shaft 54. During engagement in the fifth ratio, with the plate 66 moved downward in the direction of Arrow G, the pin 80 is retained in a neutral position by the slots 96C and 104 and the pin 120 is retained in the neutral position by the slots 100C and the neutral slot 108.

Figure 9:
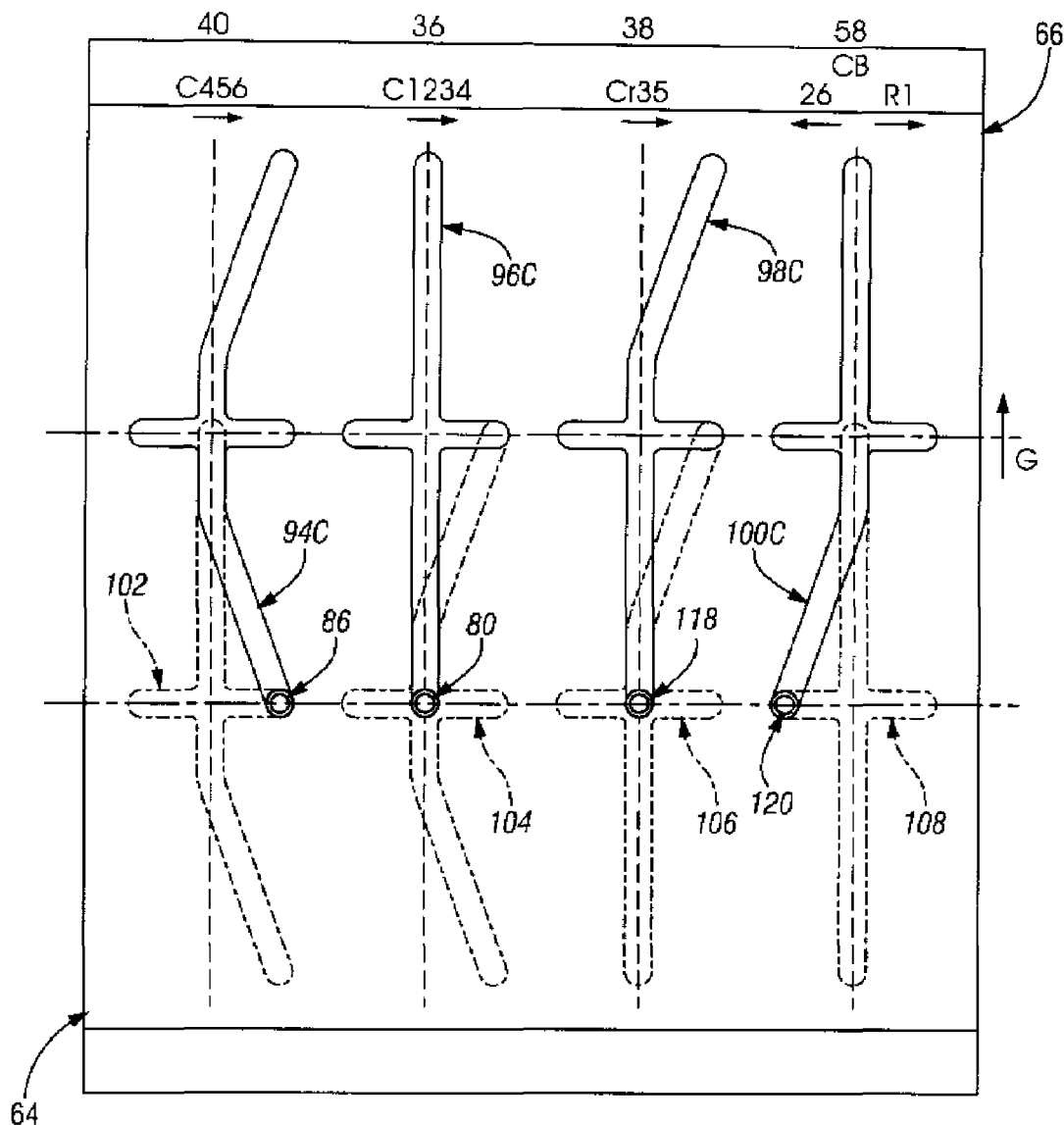
FIG. 9 is a diagrammatic representation of the slot configuration for the 5-6 control plate wherein the control plate is shifted to the sixth ratio position.

As seen in FIG. 9, the plate 66 has been moved upward relative to the stack of plates in the direction of arrow G such that the pin 86 is moved rightward by the interaction of the slots 94C and 102, the pin 120 is moved leftward by the interaction of the slots 100C and 108, while the pins 80 and 118 remain in the neutral position by the interaction of their respective slots 96C, 104 and 98C, 106.

The manipulation of the plate 66 upward in the direction of Arrow G will result in the pin 118 being returned to the neutral position while the pin 120 is moved leftward. The pin 120 manipulates the synchronizer 58 to provide a ground connection at the sun gear member 42 while the synchronizer 38 is returned to the neutral thereby disconnecting the planet carrier member 30 from the sun gear member 42. With the sun gear member 42 held stationary and the planet carrier member 56 driven by the input shaft 34 through the synchronizer 40, the Ravigneaux gearset 20 is placed in a high overdrive condition thereby resulting in a forward rotation of the output shaft 54.

Figure 10:
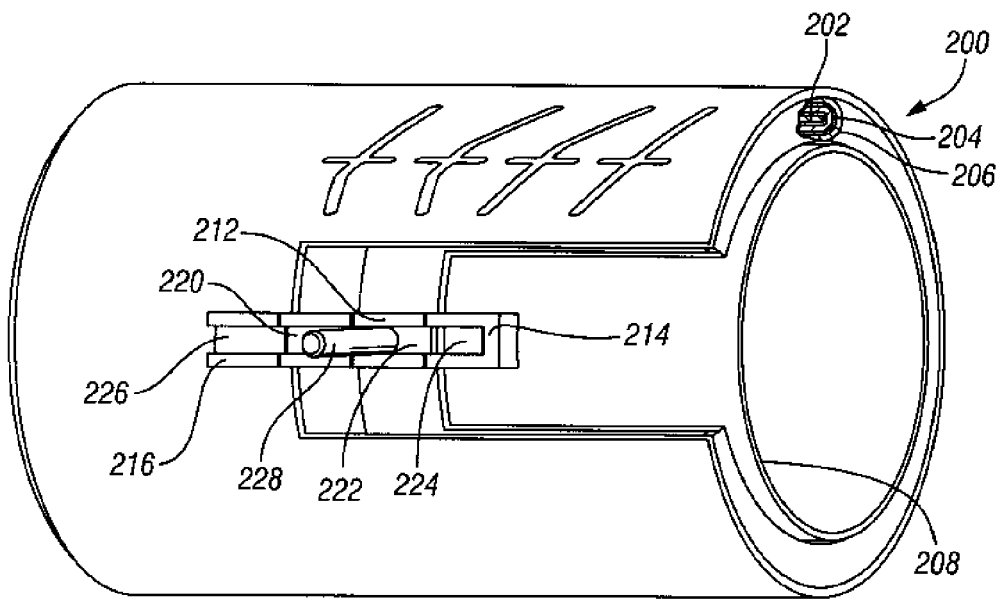
FIG. 10 is a diagrammatic representation of an alternative configuration for the shift control mechanism.

An alternative embodiment of a shift control mechanism 200 is shown in FIG. 10. In the shift control mechanism 200, a plurality of tubular members 202, 204, 206, and 208 are nested and they surround the transmission, which is not shown. Each of the tubular members 202, 204, 206, and 208 have respective control connectors 210, 212, 214, and 216. The control connectors each have respective slot portions 220, 222, 224, and 226.

A conventional shift control mechanism having a rod end is manipulable among the slots 220, 222, 224, and 226 to establish which of the tubular members 202, 204, 206, and 208 will be manipulated by the control mechanism. Each of the tubular members 202, 204, 206, and 208 have slots formed therein, one set of the slots is shown in FIG. 10. The slot configurations are substantially identical with the slot configurations shown above in FIGS. 4 through 7. The rotation of the tubular members 202, 204, 206, and 208 results in similar movement of control pins 80, 86, 118, and 120, and thereby manipulation of the synchronizers 36, 38, 40, and 58.

Figure 11:
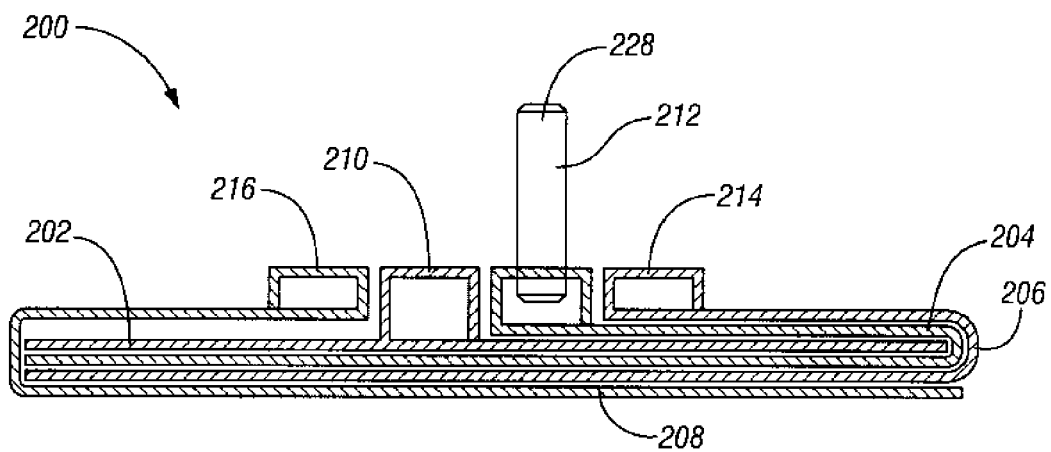
FIG. 11 is a partial view of the configuration shown in FIG. 10 describing a portion of the shift control mechanism.

It should be appreciated that similar type control mechanisms, as that shown in FIG. 11, can be employed to manipulate the plates 60, 62, 64, and 66. It should now be apparent that a conventional manual shift linkage having a pin 228 operable to engage in the slots 220, 222, 224, and 226 and manipulable east-west to make a slot selection and north-south to make a gear selection by rotating the respective tubular member 202, 204, 206, or 208. This is a standard shift pattern in manual transmission controls. A similar control can be employed to manipulate the plates 60, 62, 64, and 66 fore and aft and transversely as desired by the operator to control the gear ratio in the vehicle transmission. If desired, those skilled in the art will be aware that a conventional manual control mechanism (i.e. rod and linkage or flexible push-pull cable) can be employed to permit manual control of the transmission. In the alternative, a conventional hydraulically actuated system, or a conventional electrically actuated system, or a conventional electro-hydraulically actuated system can be employed.

It should be obvious to those skilled in the art that this shift mechanism can be applied to other planetary gear arrangements of any number of forward or reverse speeds, the only difference would be the number of plates required and the specific direction of the slots to provide the desired shift rail motion for each specific ratio.

The invention claimed is:

1. A control mechanism for a planetary manual transmission having multiple synchronizers each having a neutral position and at least one engaged position and a plurality of shift control rods adapted to move the synchronizers, said control mechanism comprising:
    a plurality of slotted plate members each having a distinct slot configuration for each shift control rod;
    a control pin secured to each of said shift control rods and disposed in each of said slot configurations in each of said slotted plate members; and
    means for manipulating said slotted plate members individually to enforce selective movement of said pins to thereby control at least two synchronizers into respective engaged positions, and
    means for preventing movement of more than one said slotted plate member at a time.

2. The control mechanism defined in claim 1 further comprising:
    at least one of said slotted plate members being a neutral member; and
    the remaining slotted plate members being ratio control members.

3. The control mechanism defined in claim 1 further comprising:
    at least four ratio control members; with at least one of said four ratio control members being a reverse ratio control member.

4. The control mechanism defined in claim 3 further wherein:
    at least three of said slotted plate members are each moveable to individually establish at least two forward ratios.

5. The control defined in claim 1 further wherein:
    each of said slotted plate members is a substantially flat plate member; and
    said means for preventing movement of more than one slotted plate member at a time comprising each of said flat plate members having a pair of spaced longitudinal grooves that are nested when all of the plate members are positioned in a neutral position.

6. The control mechanism defined in claim 5 further wherein:
    each of said spaced longitudinal grooves has a predetermined depth and a movement of one of said plate members from the neutral position to a ratio position causing the remaining plate member to be moved vertically a distance equal to twice said predetermined depth.

7. The control mechanism defined in claim 1 further wherein:
    each of said slotted plate members are tubular structures that are individually moveable and restrained from movement by said means for preventing movement of more than one slotted plate member at a time.

8. A control mechanism for a planetary manual transmission having multiple synchronizers each having a neutral position and at least one engaged position comprising, in combination:
    a plurality of shift rails adapted to move such synchronizers,
    a plurality of slotted plate members each having a distinct slot configuration for each shift rail;
    a control pin secured to each of said shift rails and disposed in said slot configurations in each of said slotted plate members; and
    means for manipulating said slotted plate members to achieve selective movement of said pins to translate at least two of such synchronizers into respective engaged positions, and
    means for preventing movement of more than one of said slotted plate members at a time.

9. The control mechanism defined in claim 8 wherein said shift rails are disposed in parallel.

10. The control mechanism defined in claim 8 wherein said means for preventing movement includes a pair of parallel grooves in each slotted plate member, said grooves being nested when said control mechanism is in a neutral position and springs for applying a biasing force to said slotted plate members.

11. The control mechanism defined in claim 8 wherein said means for manipulating said plate members includes a slotted portion associated with said plate members, said slotted portions being aligned when said plate members are in a neutral position and a shift control pin movable fore-and-aft and transversely in said slotted portions.

* * * * *